United States Patent
Vega Velazquez et al.

(10) Patent No.: US 9,802,552 B2
(45) Date of Patent: Oct. 31, 2017

(54) TRIM PANEL MOUNTING SYSTEM FOR SECURING A TRIM PANEL TO A SUBSTRATE

(71) Applicant: FORD GLOBAL TECHNOLOGIES, LLC, Dearborn, MI (US)

(72) Inventors: Sergio Alberto Vega Velazquez, Nicolas Romero (MX); Jorge Jara Zambrano, Atizapán de Zaragoza (MX)

(73) Assignee: Ford Global Technologies, PLLC, Dearborn, MI (US)

( * ) Notice: Subject to any disclaimer, the term of this patent is extended or adjusted under 35 U.S.C. 154(b) by 17 days.

(21) Appl. No.: 14/740,311

(22) Filed: Jun. 16, 2015

(65) Prior Publication Data
US 2016/0368433 A1 Dec. 22, 2016

(51) Int. Cl.
*B60R 13/02* (2006.01)
*F16B 5/06* (2006.01)
*F16B 13/04* (2006.01)

(52) U.S. Cl.
CPC ........ *B60R 13/0206* (2013.01); *F16B 5/0657* (2013.01); *F16B 13/04* (2013.01); *Y10T 24/30* (2015.01); *Y10T 24/309* (2015.01); *Y10T 24/44026* (2015.01)

(58) Field of Classification Search
CPC . Y10T 24/309; Y10T 24/30; Y10T 24/44026; B60R 13/02; B60R 13/0206; F16B 13/04; F16B 5/0657; F16B 5/0642
See application file for complete search history.

(56) References Cited

U.S. PATENT DOCUMENTS

| | | | |
|---|---|---|---|
| 5,193,961 A | 3/1993 | Hoyle et al. | |
| 5,507,610 A | 4/1996 | Benedetti et al. | |
| 5,531,499 A | 7/1996 | Vecchio et al. | |
| 5,975,820 A | 11/1999 | Kirchen | |
| 6,196,607 B1 | 3/2001 | Gulisano | |
| 6,813,865 B2 | 11/2004 | Peterson | |
| 7,114,221 B2 | 10/2006 | Gibbons et al. | |
| 7,134,170 B2 | 11/2006 | Gibbons et al. | |
| 7,178,855 B2 | 2/2007 | Catron et al. | |
| 7,481,474 B2 | 1/2009 | Higgins et al. | |
| 7,954,205 B2 | 6/2011 | Xueyong et al. | |
| 2014/0255089 A1* | 9/2014 | Courtin | F16B 5/065 403/326 |

* cited by examiner

*Primary Examiner* — Robert J Sandy
*Assistant Examiner* — Michael Lee
(74) *Attorney, Agent, or Firm* — Vichit Chea; King & Schickli, PLLC

(57) ABSTRACT

A trim panel mounting system is provided for securing a trim panel to a substrate. That trim panel mounting system includes a push pin, a push pin holder and a trim panel. That trim panel includes at least one mounting post engaging the push pin holder and a resilient retention finger capturing the push pin between the trim panel and the push pin holder.

11 Claims, 6 Drawing Sheets

TRIM PANEL MOUNTING SYSTEM FOR SECURING A TRIM PANEL TO A SUBSTRATE

TECHNICAL FIELD

This document relates generally to the field of motor vehicles and, more particularly, to a trim panel mounting system for securing a trim panel to a substrate such as a sheet metal panel.

BACKGROUND

The push pin is a fastener commonly utilized by the automotive industry to affix plastic parts such as a trim panel to a substrate such as a sheet metal panel. Thus, for example, a push pin may be utilized as an attachment means for securing a door trim panel to an inner sheet metal panel. As illustrated in FIG. 1, the trim panel T incorporates a "doghouse" feature D to hold the push pin P in position on the trim panel as the trim panel is connected to the underlying substrate or sheet metal panel S.

A special element is needed in the trim panel mold in order to create the doghouse feature. That special element, known as a "lifter" is an internal action in the mold that allows one to mold the plastic features that are not open to normal core/cavity die draw direction. A mold that incorporates a "lifter" may require an increase in investment capital on the order of 10% to 15% per action depending on the complexity. Thus, a mold that incorporates a lifter requires a substantial additional capital investment.

It should be further appreciated that such a lifter needs a minimum distance "A" for the steel of the mold not to overheat, break or wear out. See FIG. 2. This distance is 6.5 mm. Added to this, the minimum distance required to set up the push pin to sheet metal connection is "B", a distance of 9.5 mm. Thus, a prior art trim panel T incorporating a push pin P using a traditional doghouse feature D requires a minimum distance C of 16 mm from flange to sheet metal. This minimum clearance distance C represents a significant limitation for vehicle designers.

This document relates to a new and improved trim panel mounting system which eliminates the traditional doghouse feature and, thus, the need for a "lifter" in the trim panel mold. Thus, the new trim panel mounting system reduces capital investment for the mold. Further, it also reduces the necessary clearance required for a push pin connection between the trim panel and the sheet metal panel/substrate to as little as 12 mm or less: that is, approximately a 25% reduction in clearance requirement from the traditional 16 mm clearance as illustrated in FIG. 2. Thus, the proposed trim panel mounting system represents a significant advance in the art.

SUMMARY

In accordance with the purposes and benefits described herein, a trim panel mounting system is provided for securing a trim panel to a substrate. That trim panel mounting system comprises a push pin, a push pin holder and a trim panel including at least one mounting post engaging the push pin holder and a resilient retention finger capturing the push pin between the trim panel and the push pin holder. The push pin holder includes a keyhole opening for receiving the push pin. Further, the push pin holder includes two locating apertures. The keyhole opening is provided between the two locating apertures.

More specifically, the keyhole opening includes an entry, a push pin retention slot and a constriction between the entry and the push pin retention slot. In one possible embodiment, the entry has a width $W_1$, the retention slot has a width $W_2$, and the constriction has a width $W_3$ where $W_1 > W_2 > W_3$.

Further, the resilient retention finger has a resilient lever arm and a stop on a distal end of the resilient lever arm. The resilient retention finger has a home position wherein the stop is received within the entry of the keyhole opening in the push pin holder. In one possible embodiment, that entry extends through a sidewall of the push pin holder. Further, the push pin includes a mounting neck received in the push pin retention slot and a base captured between the trim panel and the push pin holder.

In accordance with an additional aspect, a method is provided of reducing the space between a trim panel and a sheet metal panel to which the trim panel is connected by push pin. That method may be broadly described as comprising the step of capturing a push pin on the trim panel with a separate, overlying push pin holder and a resilient retention finger integrally formed in the trim panel. The method further includes reducing space between the trim panel and the sheet metal panel to less than 16 mm. In another possible embodiment the method includes reducing the space between the trim panel and the sheet metal panel to less than 15 mm. In yet another embodiment, to less than 14 mm. In yet another embodiment, to less than 13 mm. In yet another embodiment, to less than 12 mm.

Further, the method includes locating the push pin holder on the trim panel by providing the trim panel with at least one mounting post received in at least one locating aperture provided in the push pin holder and heat staking the push pin holder in position on the trim panel by melting that mounting post.

Further, the method includes providing the push pin holder with a keyhole opening and providing the keyhole opening between two locating apertures.

Still further the method includes receiving the resilient retention finger at least partially in an entry of the keyhole opening to retain the push pin in position under the push pin holder.

In the following description, there are shown and described several preferred embodiments of the trim panel mounting system. As it should be realized, the trim panel mounting system is capable of other, different embodiments and its several details are capable of modification in various, obvious aspects all without departing from the system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the trim panel mounting system and together with the description serve to explain certain principles thereof. In the drawing figures.

Figure 4A:
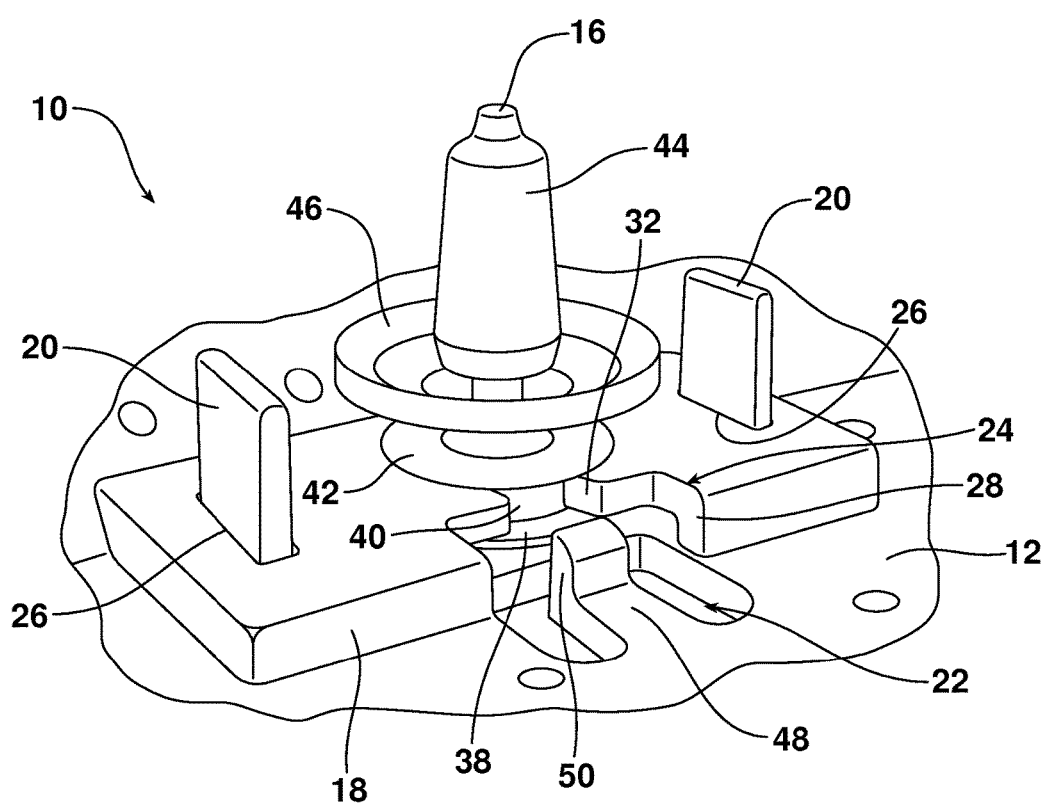
Figure 4B:
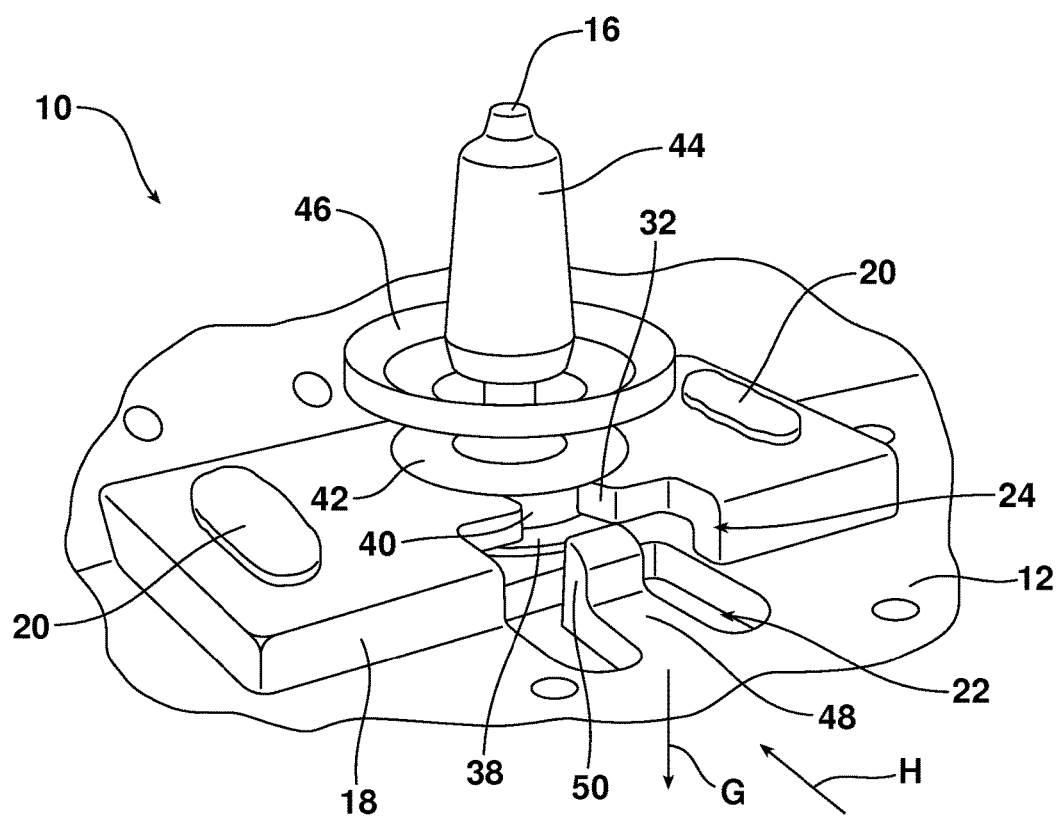

FIGS. 4a and 4b illustrate how a push pin is captured between the push pin holder and the trim panel of the new trim panel mounting system. More specifically, FIG. 4a illustrates how the push pin holder is located on the mounting post of the trim panel while FIG. 4b illustrates the melting of those posts and the heat staking of the push pin holder in position with the push pin captured between the push pin holder and the trim panel.

Figure 5:
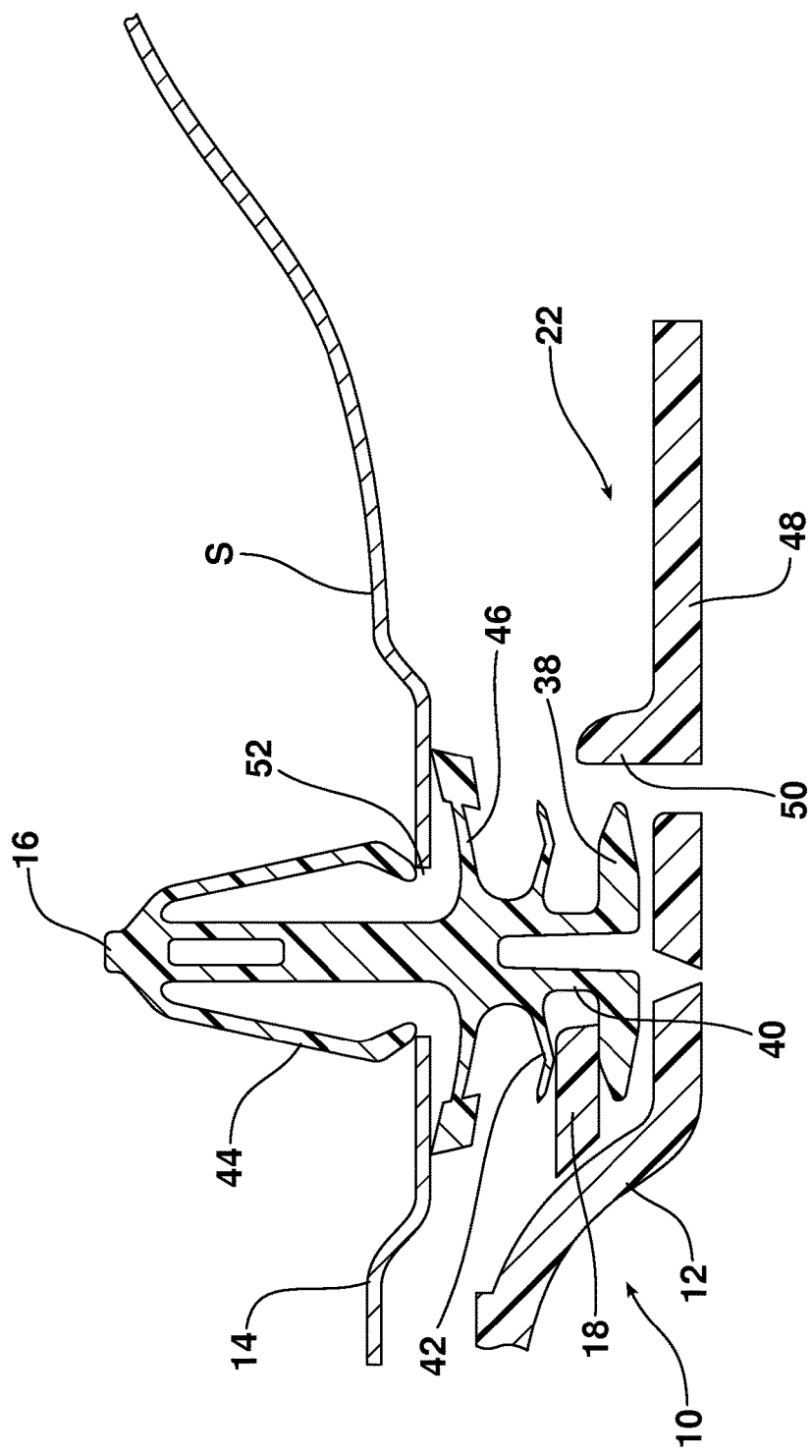

FIG. 5 is a schematic cross-sectional view illustrating the utilization of the new trim panel mounting system to secure the trim panel to a sheet metal panel or substrate.

Reference will now be made in detail to the present preferred embodiments of the trim panel mounting system, examples of which are illustrated in the accompanying drawing figures.

DETAILED DESCRIPTION

Reference is now made to FIGS. 3a, 3b, 4a, 4b and 5 illustrating the new trim panel mounting system 10 for securing a trim panel 12 to a substrate or underlying sheet metal panel 14. That trim panel mounting system 10 includes a push pin 16, a push pin holder 18 and the trim panel 12 which includes at least one mounting post 20 for engaging the push pin holder and a resilient retention finger, generally designated by reference numeral 22, for capturing the push pin between the trim panel and the push pin holder. In the illustrated embodiment two mounting posts 20 are provided and both of the mounting posts and the resilient finger 22 are integrally molded as a unitary part of the trim panel 12.

Figure 3A:
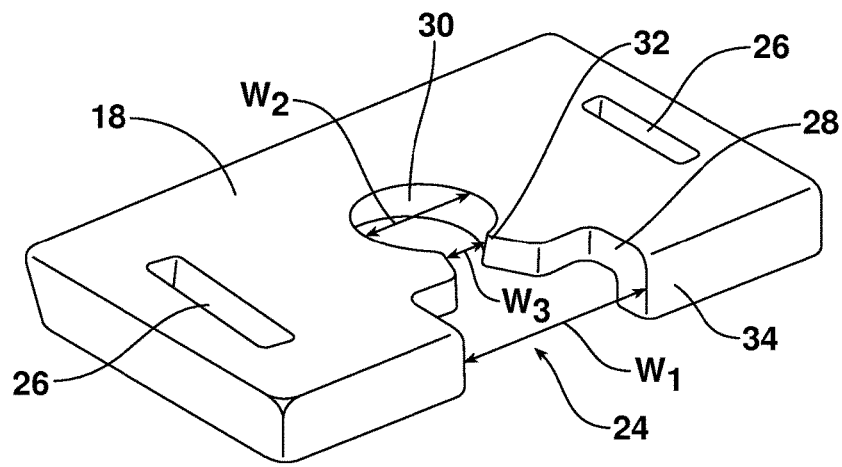
FIGS. 3a and 3b are respective top perspective and bottom perspective views of the push pin holder component of the new trim panel mounting system.
Figure 3B:
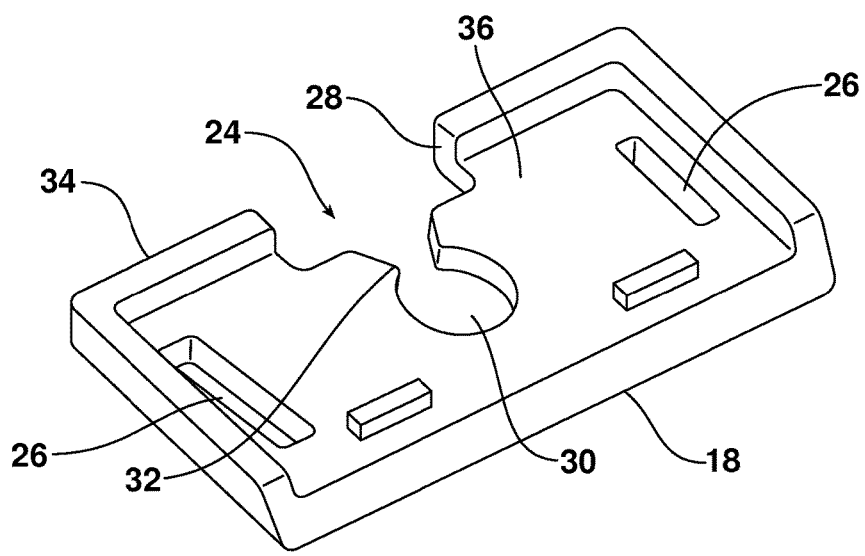

As illustrated in FIGS. 3a and 3b, a push pin holder 18 includes a keyhole opening 24 and two locating apertures 26. In the illustrated embodiment, the keyhole opening 24 is provided between the locating apertures 26.

The keyhole opening 24 includes an entry 28 in communication with a push pin retention slot 30. A constriction 32 is provided between the entry 28 and the push pin retention slot 30. As illustrated, the entry 28 has a width $W_1$, the retention slot 30 has a width $W_2$ and the constriction 32 has a width $W_3$ where $W_1 > W_2 > W_3$. Further, the entry 28 extends through the sidewall 34 of the push pin holder 18. Still further, as illustrated in FIG. 3b, the bottom face of the push pin holder 18 includes a recess 36.

As best illustrated in FIGS. 4a, 4b and 5, the push pin 16 includes a base 38, a mounting neck 40 provided between the base 38 and a retention flange 42, a resilient connecting portion 44 and a biasing disc 46. In the illustrated embodiment, the resilient connecting portion 44 of the push pin 16 is provided with a circumferentially uniform surface and construction, but it should be appreciated that the resilient connecting portion 44 may be realized with other, alternate construction or design such as slits or baffles without deviating from the design of the trim panel mounting system as disclosed herein.

The push pin holder 18 is secured in proper position on the trim panel 12 by aligning the locating apertures 26 with the two mounting posts 20 provided on the trim panel. The push pin holder 18 is then pushed down over those posts 20 until the holder is seated against the underlying wall of the trim panel 12 (see FIG. 4a). The portion of the posts 20 projecting above the push pin holder 18 are then melted, as illustrated in FIG. 4b, in order to heat stake the push pin holder 18 in position on the trim panel 12 with the base 38 of the push pin captured between the push pin holder and the trim panel.

Reference is now made to FIGS. 4b and 5 illustrating the resilient retention finger 22 provided on the trim panel 12. As illustrated, the resilient finger 22 comprises a resilient lever arm 48 and a stop 50 on a distal end of that lever arm. The resilient retention finger 22 has a home position wherein the stop 50 is received within the entry 28 of the keyhole opening 24 in the push pin holder 18. The push pin 16 is connected to the trim panel 12 by aligning the mounting neck 40 with the constriction 32 while pushing the resilient retention finger 22 downward (note action arrow G). The mounting neck 40 of the push pin 16 is then pushed toward the retention slot 30 (note action arrow H) so that the neck snaps past the constriction 32 and is received in the retention slot while the base 38 is received in the recess 36 of the push pin holder 18. Once the base 38 clears the resilient retention finger 22, that finger displaces upwardly (in a direction opposite action arrow G) under resilient memory into its home position. There the resilient retention finger 22 is aligned with the base 38 of the push pin 16 thereby capturing the base in the recess 36 of the push pin holder 18. The resilient retention FIG. 22 functions with the constriction 32 to prevent the push pin 16 from sliding back out of the push pin holder 18 in a direction opposite to that used to install the push pin.

Should one ever need to replace the push pin 16 for any reason, the resilient finger 22 may be depressed downward in the direction of action arrow G so that the push pin may be displaced to the right through the constriction 32, with the base 38 clearing the top of the stop 50. A new push pin 16 may then be inserted back into the retention slot 30 and recess 36 of the push pin holder 18. When the resilient finger 22 is released, it again returns to the position illustrated in FIGS. 4b and 5 under resilient memory, aligned with the base 38 so as to retain and capture the base 38 of the new push pin 16 in the recess 36 of the push pin holder 18.

Figure 1:
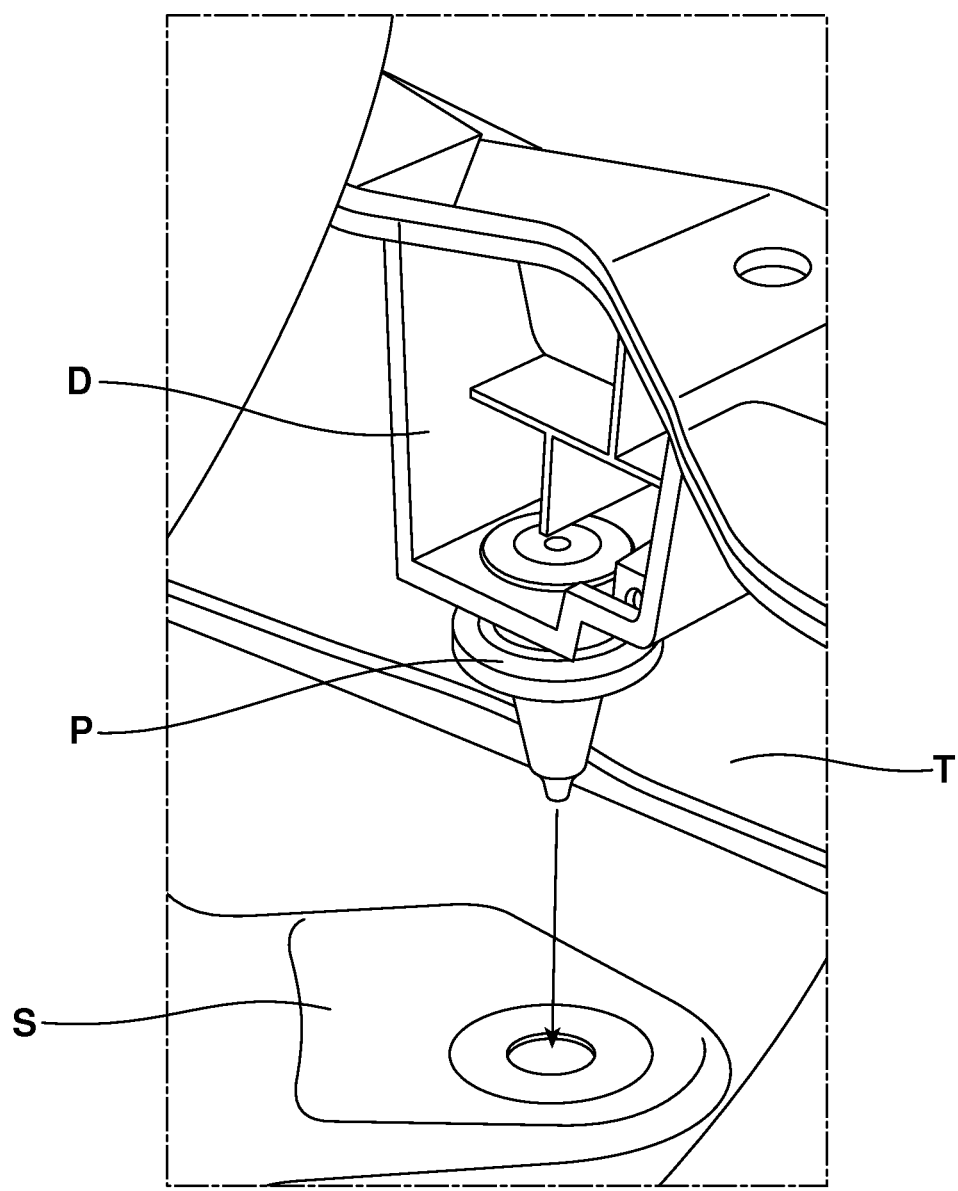
FIG. 1 is a perspective view of a prior art trim panel mounting system wherein the trim panel incorporates a doghouse feature for holding the push pin on the trim panel prior to connection with the substrate or sheet metal panel.
Figure 2:
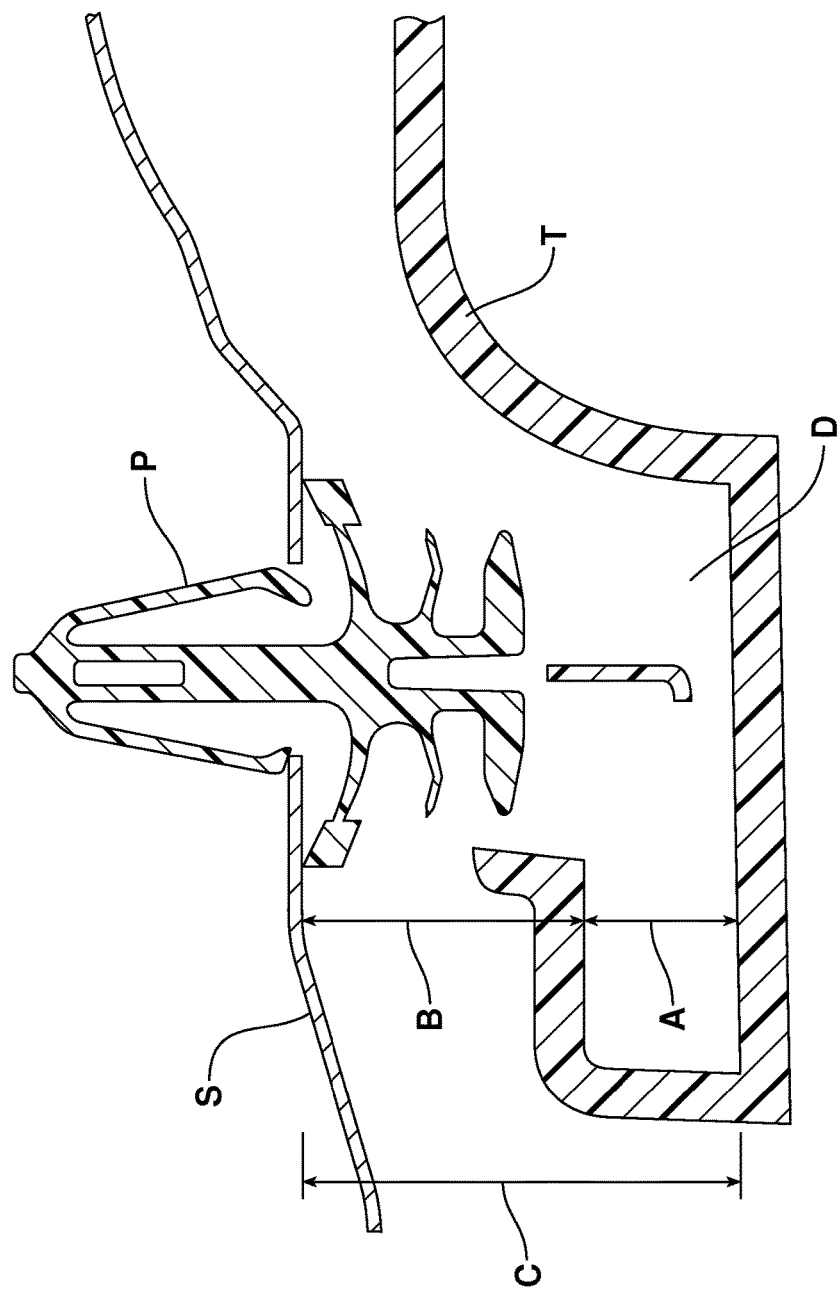
FIG. 2 is a schematic cross-sectional illustration of the prior art trim panel connected to a sheet metal panel/substrate by the push pin that illustrates the necessary clearances for that construction.

As illustrated in FIG. 5, the trim panel 12 is connected to the sheet metal panel/substrate 14 by inserting the connecting portion 44 of the push pin 16 through the aperture 52 in the substrate. When the push pin 16 is fully inserted in the aperture 52, the resilient sidewalls of the connecting portion 44 spread outwardly to secure the connection while the biasing disc 46 functions to eliminate play between the trim panel and the sheet metal panel. As should be appreciated, the trim panel mounting system 10 only requires approximately 12 mm of clearance between the two panels 12, 14 to allow the push pin connection. This is approximately 25% less than the prior art trim panel mounting system illustrated in FIGS. 1 and 2 incorporating the doghouse feature D.

In summary, the trim panel mounting system 10 that is the subject matter of this document provides a number of benefits and advantages. As previously noted, it reduces the capital investment cost for the trim panel mold by eliminating the need to provide a "lifter" as was necessary in the prior art in order to form the doghouse feature D for holding the push pin P. Further, the trim panel mounting system 10 effectively reduces the space required between the trim panel 12 and the sheet metal panel or substrate 14 to which the trim panel is connected. This is accomplished by capturing the push pin 16 on the trim panel 12 with a separate, overlying push pin holder 18 and a resilient finger 22 integrally formed with the trim panel. Advantageously, the space between the trim panel 12 and sheet metal panel 14 may be reduced to less than 16 mm. In another embodiment, to less than 15 mm. In yet another, to less than 14 mm. In yet another, to less than 13 mm and in yet another, to less than 12 mm. This reduction in clearance space provides the designers with more freedom in designing the trim panels 12 and sheet metal panels 14 and eliminates wasted space so that that space may be utilized for other more useful purposes such as interior passenger cabin space.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A trim panel mounting system for securing a trim panel to a substrate, comprising:
   a push pin;
   a push pin holder; and
   a trim panel including at least one mounting post engaging said push pin holder and a resilient retention finger capturing said push pin between said trim panel and said push pin holder.

2. The trim panel mounting system of claim 1, wherein said push pin holder includes a key hole opening for receiving said push pin.

3. The trim panel mounting system of claim 2, wherein said push pin holder further includes two locating apertures.

4. The trim panel mounting system of claim 3, wherein said keyhole opening is provided between said two locating apertures.

5. The trim panel mounting system of claim 4, wherein said at least one mounting post includes two mounting posts wherein said two mounting posts are received in said two locating apertures.

6. The trim panel mounting system of claim 5, wherein said keyhole opening includes an entry, a push pin retention slot and a constriction between said entry and said push pin retention slot.

7. The trim panel mounting system of claim 6, wherein said entry has a width $W_1$, said retention slot has a width $W_2$ and said constriction has a width $W_3$ where $W_1 > W_2 > W_3$.

8. The trim panel mounting system of claim 7, wherein said resilient retention finger has a resilient lever arm and a stop on a distal end of said resilient lever arm.

9. The trim panel mounting system of claim 8, wherein said resilient retention finger has a home position wherein said stop is received within said entry of said push pin holder.

10. The trim panel mounting system of claim 9, wherein said entry extends through a sidewall of said push pin holder.

11. The trim panel mounting system of claim 1, wherein said push pin includes a mounting neck received in said push pin retention slot and a base captured between said trim panel and said push pin holder.

* * * * *